(12) United States Patent
Takahashi et al.

(10) Patent No.: US 10,824,382 B2
(45) Date of Patent: *Nov. 3, 2020

(54) IMAGE FORMING APPARATUS AND CONTROL METHOD OF IMAGE FORMING APPARATUS

(71) Applicant: TOSHIBA TEC KABUSHIKI KAISHA, Shinagawa-ku, Tokyo (JP)

(72) Inventors: Nobuaki Takahashi, Shimizu Sunto Shizuoka (JP); Yoji Sato, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/518,551

(22) Filed: Jul. 22, 2019

(65) Prior Publication Data

US 2020/0117408 A1    Apr. 16, 2020

Related U.S. Application Data

(63) Continuation of application No. 16/157,888, filed on Oct. 11, 2018, now Pat. No. 10,402,137.

(51) Int. Cl.
*G06F 3/12* (2006.01)
*G03G 15/01* (2006.01)
(Continued)

(52) U.S. Cl.
CPC ....... *G06F 3/1273* (2013.01); *G03G 15/0136* (2013.01); *G03G 15/16* (2013.01); *G03G 15/2053* (2013.01)

(58) Field of Classification Search
None
See application file for complete search history.

(56) References Cited

U.S. PATENT DOCUMENTS 6,580,523 B1 * 6/2003 Yoshimoto ............. H04N 1/506
                                                   358/1.4
8,086,115 B2   12/2011 Yamasaki et al.
(Continued)

FOREIGN PATENT DOCUMENTS

JP          06258905      *  9/1994  ............. G03G 15/01

OTHER PUBLICATIONS

Notice of Allowance on U.S. Appl. No. 16/157,888 dated Apr. 24, 2019.

*Primary Examiner* — Beniyam Menberu
(74) *Attorney, Agent, or Firm* — Foley & Lardner LLP

(57) ABSTRACT

An image forming apparatus and a control method of an image forming apparatus having high convenience are provided. The image forming apparatus includes an image transfer system and a processor. The image transfer system is configured to be switchable between a first position, where printing is performed in a first mode, and a second position, where printing is performed in a second mode. The processor, when executing a print job by switching a position of the image transfer system to a position set in advance as a home position at a waiting time for printing, switches the position of the image transfer system to a position corresponding to the print job and sets the home position based on a result of comparison between a print history in a first mode and a print history in a second mode.

19 Claims, 7 Drawing Sheets

(51) Int. Cl.
*G03G 15/16* (2006.01)
*G03G 15/20* (2006.01)
*G06K 15/02* (2006.01)

(56) References Cited

U.S. PATENT DOCUMENTS

| | | | |
|---|---|---|---|
| 8,570,545 | B2 | 10/2013 | Okunishi et al. |
| 9,374,496 | B1 | 6/2016 | Ishino et al. |
| 10,402,137 | B1* | 9/2019 | Takahashi .............. G06F 3/1273 |
| 2003/0091370 | A1* | 5/2003 | Ono ................... G03G 15/5025 |
| | | | 399/226 |
| 2005/0244594 | A1* | 11/2005 | Shimazu ............ G03G 15/1675 |
| | | | 428/32.52 |
| 2009/0059246 | A1 | 3/2009 | Okunishi et al. |
| 2018/0039212 | A1* | 2/2018 | Tomine .............. G03G 15/5054 |

* cited by examiner

| IDENTIFICATION NUMBER | DATE AND TIME (TIME STAMP) | USER IDENTIFICATION INFORMATION | MODE INFORMATION | NUMBER OF PRINTED SHEETS | NUMBER OF PRINTED COPIES |
|---|---|---|---|---|---|
| 0001 | 2018/03/31 15:00 | A | COLOR MODE | 3 | 1 |
| 0002 | 2018/03/31 15:05 | A | COLOR MODE | 3 | 1 |
| 0003 | 2018/03/31 15:08 | B | MONOCHROME MODE | 20 | 15 |
| 0004 | 2018/03/31 15:09 | C | MONOCHROME MODE | 15 | 15 |
| 0005 | 2018/03/31 15:15 | A | COLOR MODE | 1 | 2 | ized
IMAGE FORMING APPARATUS AND CONTROL METHOD OF IMAGE FORMING APPARATUS

CROSS-REFERENCE TO RELATED APPLICATIONS

The present application is a continuation of U.S. patent application Ser. No. 16/157,888 filed Oct. 11, 2018, the entire disclosure of which is incorporated herein by reference.

FIELD

Embodiments described herein relate to an image forming apparatus and a control method of an image forming apparatus.

BACKGROUND

An image forming apparatus forms a toner image on a transfer belt using a developing unit, transfers the toner image formed on the transfer belt to a printing medium, and fixes the toner image to the printing medium with heat and pressure, thereby forming an image on the printing medium. An image transfer unit of the image forming apparatus has a plurality of process units for forming a toner image on a transfer belt with toners of different colors. The image forming apparatus performs printing (monochrome printing) in a monochrome mode in which a single color (monochrome) image is formed on a printing medium, using one of the plurality of process units. Further, the image forming apparatus performs printing (color printing) in a color mode in which a plurality of color images are formed on a printing medium, using the process units.

When performing the monochrome printing, the image forming apparatus sets the image transfer unit in the monochrome mode (monochrome position). The monochrome position is a state where a photoconductive drum of the process unit used for printing contacts with the transfer belt and a photoconductive drum of the other process unit is away from the transfer belt. Further, when performing the color printing, the image forming apparatus sets the image transfer unit in the color mode (color position). The color position is a state in which photoconductive drums of all the process units are in contact with the transfer belt. In the image forming apparatus, either the monochrome mode or the color mode is set as a reference mode (home position). In a state (ready state) in which printing can be performed, the image forming apparatus sets the plurality of process units of the image transfer unit to a state corresponding to the reference mode, and waits for a print instruction. Further, when receiving the print instruction in a mode different from the reference mode, the image forming apparatus performs a process (initialization process) of switching the image transfer unit to a position corresponding to the instructed mode.

However, when a frequently used mode is different from the reference mode, the frequency of the initialization process may increase, and the time to wait for the completion of the initialization process may increase.

DESCRIPTION OF THE DRAWINGS

FIG. 6 is a diagram illustrating an example of history information; and

DETAILED DESCRIPTION

In general, according to one embodiment, an image forming apparatus includes an image transfer unit (image transfer system) and a processor. The image transfer unit is configured to be switchable between a first position where printing is performed in a first mode and a second position where printing is performed in a second mode. The processor, when executing a print job by switching a position of the image transfer unit to a position set in advance as a home position at a waiting time, switches the position of the image transfer unit to a position corresponding to the print job and sets the home position based on a result of comparison between a print history in a first mode and a print history in a second mode.

An image forming apparatus and a control method of an image forming apparatus according to at least one embodiment will be described with reference to the drawings.

Figure 1:
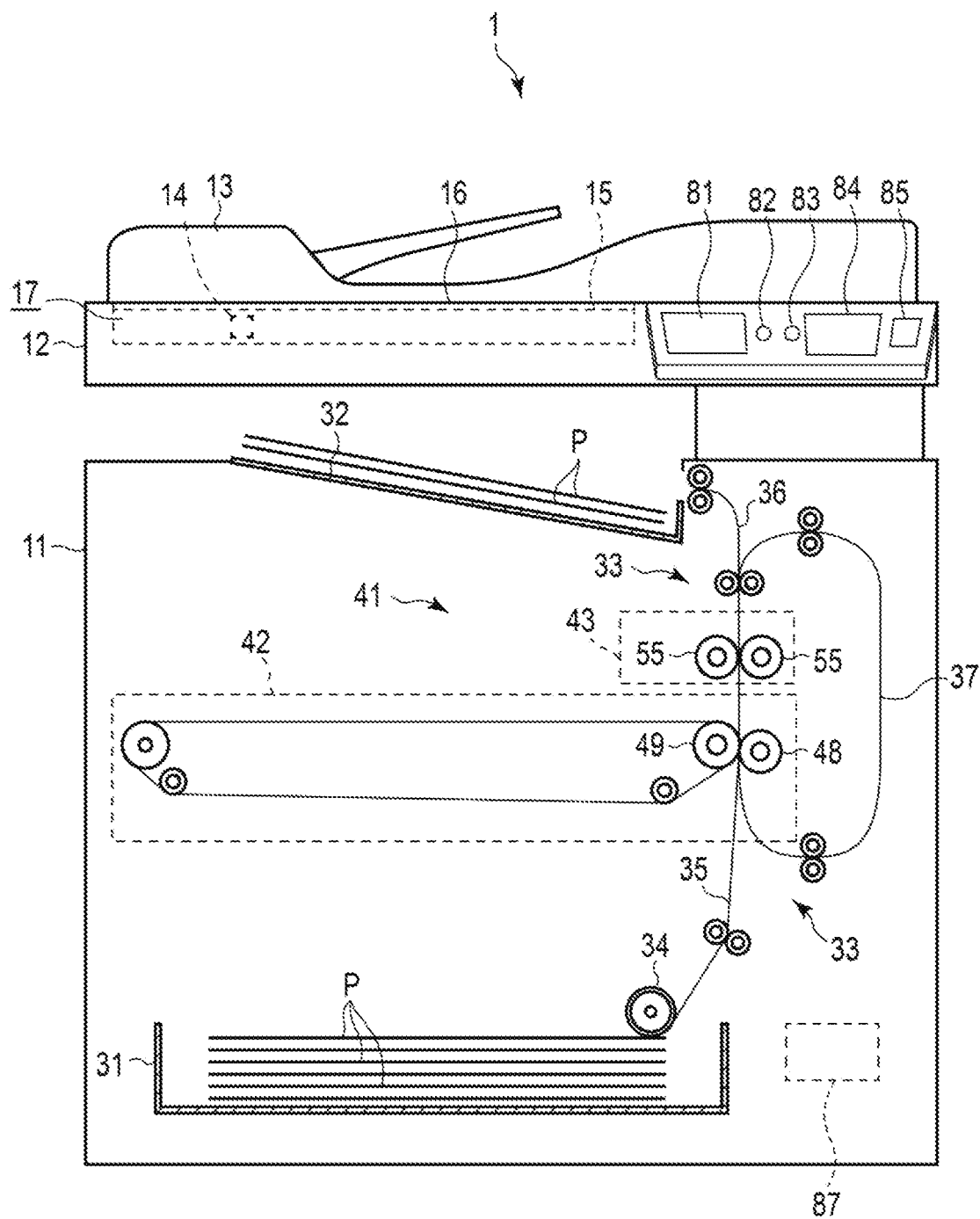
FIG. 1 is a diagram illustrating a configuration example of an image forming apparatus according to at least one embodiment.

FIG. 1 is an explanatory diagram illustrating an arrangement example of an image forming apparatus 1 according to at least one embodiment.

The image forming apparatus 1 is a multifunction printer (MFP) that performs various processes such as image formation while conveying a recording medium such as a printing medium. The image forming apparatus 1 is a solid-state scanning type printer (for example, an LED printer) that scans an LED array to perform various processes such as image formation while conveying a recording medium such as a printing medium.

The image forming apparatus 1 causes charging of a photoconductive drum and irradiates the photoconductive drum with light corresponding to an image data (print data) for printing, thereby forming an electrostatic latent image on the photoconductive drum. The image forming apparatus 1 attaches a toner to the latent image formed on the photoconductive drum, transfers the toner attached to the latent image to the printing medium, and forms a toner image on the printing medium. Further, the image forming apparatus 1 sandwiches the printing medium, on which the toner image is formed, between fixing rollers heated to a high temperature by a heater, and fixes the toner image formed on the printing medium.

Further, the image forming apparatus 1 forms reflected light of the light, which is irradiated on the printing medium, on an image sensor, reads out electric charges accumulated in the image sensor, and converts the read charges into a digital signal, thereby acquiring an image on the printing medium.

As illustrated in FIG. 1, the image forming apparatus 1 includes a housing 11, an image reading system, a conveyance system, an image forming system, a control system, various interfaces, and the like. The housing 11 is a main body that holds components of the image forming apparatus 1.

First, the image reading system of the image forming apparatus 1 will be described.

As illustrated in FIG. 1, the image forming apparatus 1 includes a document table 12, an automatic document feeder (ADF) 13, and a scanner unit 14 which are respectively configured to read an image from a document.

The document table 12 is a portion on which a printing medium P as a document is placed. The document table 12 includes a glass plate 15 on which the printing medium P as a document is placed and a space 17 located on a side opposite to a placement surface 16 of the glass plate 15 on which the printing medium P as the document is placed.

The ADF 13 is a mechanism that conveys the printing medium P. The ADF 13 is provided on the document table 12 so as to be freely opened and closed. The ADF 13 takes in the printing medium P placed on a tray under on the control of a system controller 87, and conveys the taken-in printing medium P while closely contacting it with the glass plate 15 of the document table 12.

The scanner unit 14 acquires an image from the printing medium P under the control of the system controller 87. The scanner unit 14 is disposed in the space 17 located on the side opposite to the placement surface 16 of the document table 12. The scanner unit 14 includes an image sensor, an optical element, lighting, and the like.

The image sensor is an imaging element in which pixels for converting light into an electric signal (image signal) are arranged in a line shape. The image sensor is constituted by, for example, a charge coupled device (CCD), a complementary metal oxide semiconductor (CMOS), or another imaging element.

The optical element focuses light from a predetermined reading range on the pixels of the image sensor. The reading range of the optical element is a line-shaped region on the placement surface 16 of the document table 12. The optical element focuses light reflected by the printing medium P placed on the placement surface 16 of the document table 12 and transmitted through the glass plate 15 on the pixels of the image sensor.

The lighting irradiates the printing medium P with light. The lighting includes a light source and a light guide body that irradiates the printing medium P with light emitted from the light source. The lighting irradiates, using the light guide body, a region including the reading range of the optical element with the light emitted from the light source.

When the printing medium P is placed on the placement surface 16 of the document table 12, the scanner unit 14 is driven by a driving mechanism (not illustrated) in a sub scanning direction orthogonal to the arrangement direction (main scanning direction) of the pixels of the image sensor and parallel to the placement surface 16. The scanner unit 14 is driven in the sub scanning direction and continuously acquires an image line byline using the image sensor, thereby acquiring the entire image data (document image data) of the printing medium P placed on the placement surface 16 of the document table 12.

When the printing medium P is being conveyed by the ADF 13, the scanner unit 14 is driven to a position facing a position where the printing medium P is brought into close contact with the ADF 13. The scanner unit 14 continuously acquires, using the image sensor, an image line by line from the printing medium P conveyed by the ADF 13, thereby acquiring the entire image data (document image data) of the printing medium P conveyed by the ADF 13.

The conveyance system of the image forming apparatus 1 will be described below.

As illustrated in FIG. 1, the image forming apparatus 1 includes, as a configuration of the conveyance system, a paper feed cassette 31, paper discharge tray 32, and a conveyance unit 33.

The paper feed cassette 31 is a cassette that accommodates the printing medium P. The paper feed cassette 31 is configured to be capable of supplying the printing medium P from the outside of the housing 11. For example, the paper feed cassette 31 can be taken out of the housing 11.

The paper discharge tray 32 is a tray that supports the printing medium P discharged from the image forming apparatus 1.

The conveyance unit 33 conveys the printing medium P. The conveyance unit 33 includes a conveyance path including a plurality of guides and a plurality of roller and a sensor that detects a conveyance position of the printing medium P due to the conveyance path. The conveyance path is a path along which the printing medium P is conveyed. The conveyance roller is rotated by a motor that operates based on the control of the system controller 87, thereby conveying the printing medium P along the conveyance path. Further, some of the plurality of guides is rotated by the motor that operates based on the control of the system controller 87, thereby switching the conveyance path along which the printing medium P is conveyed.

For example, as illustrated in FIG. 1, the conveyance unit 33 includes a take-in roller 34, a paper feed conveyance path 35, a paper discharge conveyance path 36, and a reverse conveyance path 37.

The take-in roller 34 takes the printing medium P accommodated in the paper feed cassette 31 into the paper feed conveyance path 35.

The paper feed conveyance path 35 is a conveyance path used for conveying the printing medium P, which is taken from the paper feed cassette 31 by the take-in roller 34, to the image forming unit 41.

The paper discharge conveyance path 36 is a conveyance path for discharging the printing medium P, on which an image is formed by the image forming unit 41, from the housing 11. The printing medium P discharged through the paper discharge conveyance path 36 is discharged to the paper discharge tray 32.

The reverse conveyance path 37 is a conveyance path for feeding the printing medium P in the state in which the front/back and the front/rear of the printing medium P, on which the image is formed by the image forming unit 41 are reversed, to the image forming unit 41 again.

The image forming system of the image forming apparatus 1 will be described below.

As illustrated in FIG. 1, the image forming apparatus 1 includes, as a configuration of the image forming system, the image forming unit 41.

The image forming unit 41 forms an image on the printing medium P based on the control of the system controller 87. The image forming unit 41 includes an image transfer unit 42 (image transfer system) and a fixing unit 43.

Figure 2:
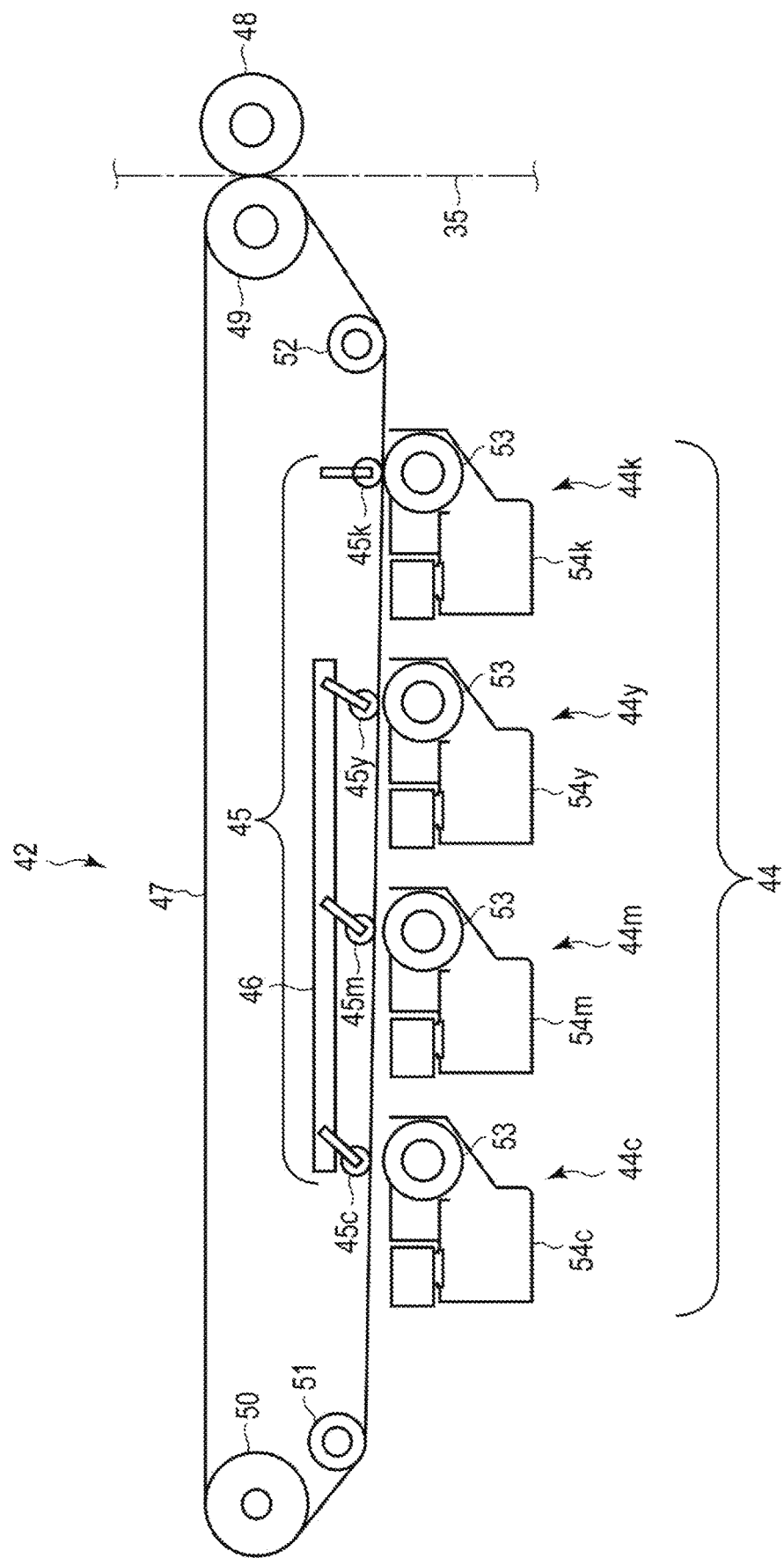
FIG. 2 is a diagram illustrating an arrangement example of an image transfer unit.
Figure 3:
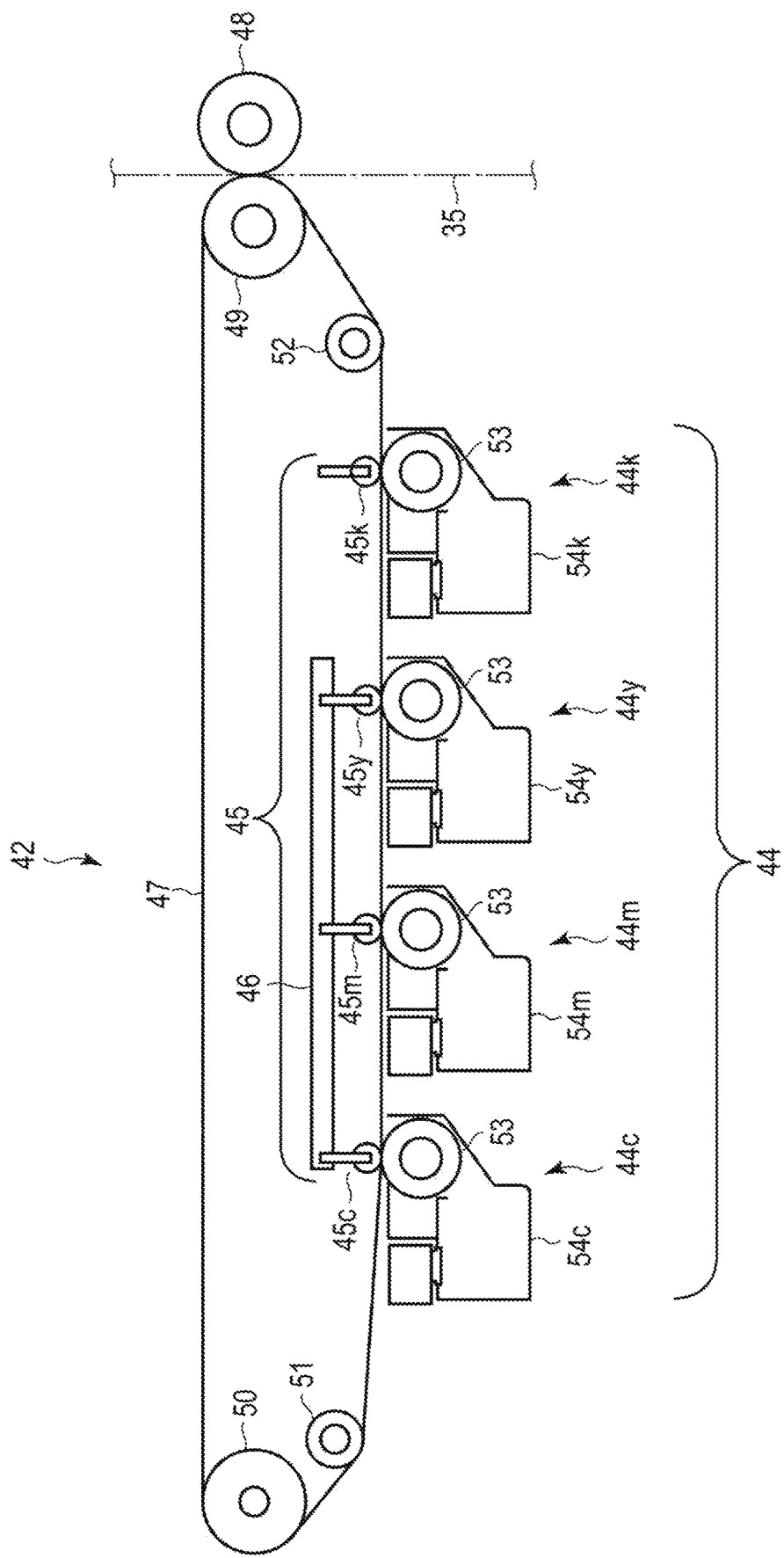
FIG. 3 is a diagram illustrating an arrangement example of the image transfer unit.
Figure 4:
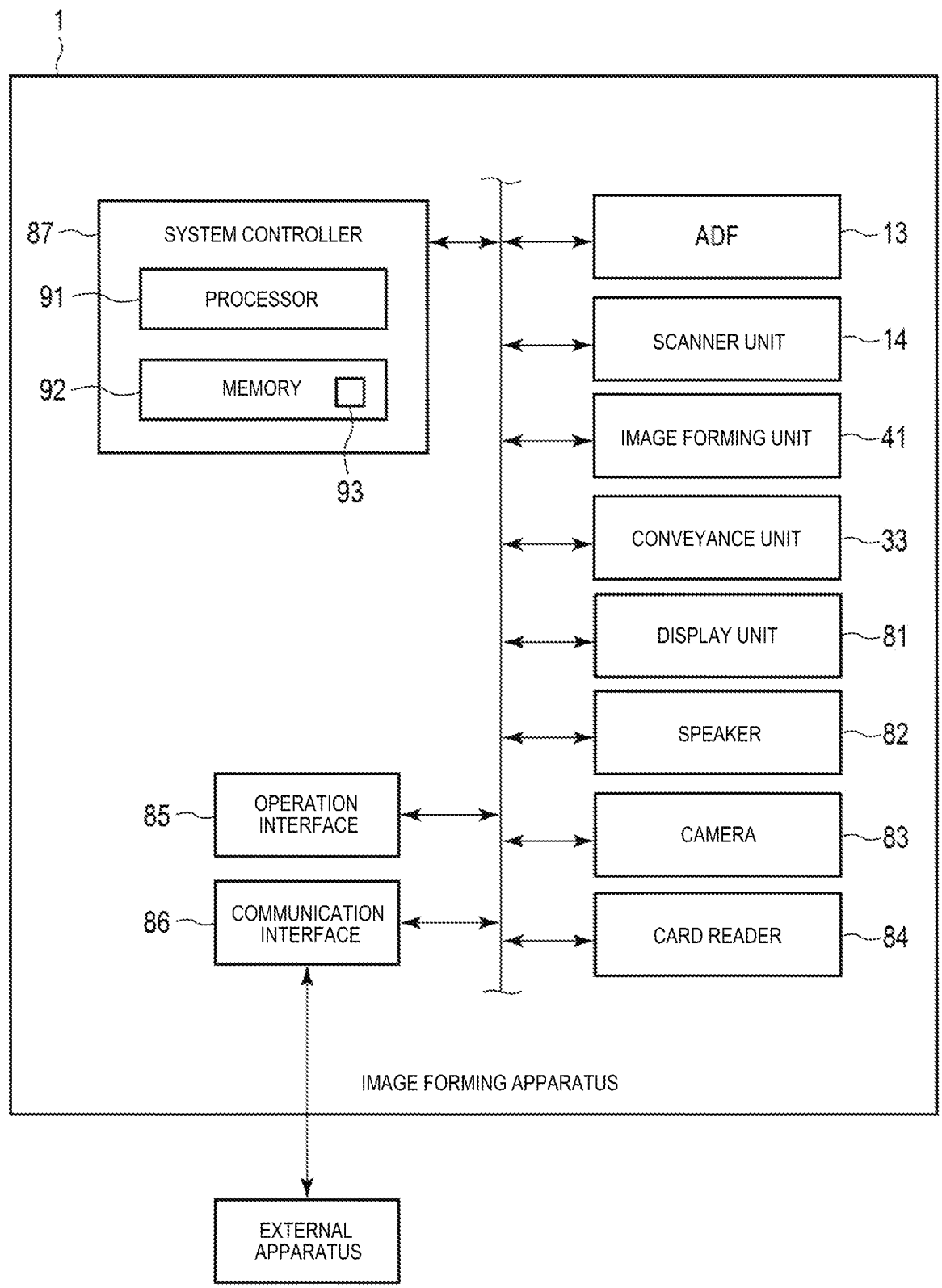
FIG. 4 is a diagram illustrating an arrangement example of a control system and various interfaces.

The image transfer unit 42 is configured to form a toner image on the printing medium P according to the print data. FIGS. 2 and 3 are explanatory diagrams for describing the configuration of the image transfer unit 42. FIG. 2 illustrates an example of the image transfer unit 42 in a case of monochrome printing. In addition, FIG. 3 illustrates an example of the image transfer unit 42 in a case of color printing.

The image transfer unit 42 includes a plurality of process units 44, a plurality of primary transfer rollers 45, a position switching mechanism 46, a primary transfer belt 47, a secondary transfer roller 48, a secondary transfer counter roller 49, a first winding roller 50, a second winding roller 51, and a third winding roller 52.

The plurality of process units 44 are configured to form a toner image corresponding to the print data on the primary transfer belt 47. Toner cartridges filled with toners of different colors such as cyan, magenta, yellow, and black are connected to the plurality of process units 44. The plurality of process units 44 are, for example, a process unit 44c to which the cyan toner cartridge is connected, a process unit 44m to which the magenta toner cartridge is connected, a process unit 44y to which the yellow toner cartridge is connected, and a process unit 44k to which the black toner cartridge is connected. The process unit 44c, the process unit 44m, the process unit 44y, and the process unit 44k have the same configuration except that the colors of the toners are different.

The process unit 44 includes a drum 53, a cleaner, a static eliminator, an electrostatic charger, an exposure unit, and a developing unit 54.

The drum 53 is a cylindrical photoconductive drum. The drum 53 is provided so as to be in contact with the primary transfer belt 47. The drum 53 is rotated at a constant speed by a driving mechanism (not illustrated).

The cleaner removes a toner remaining on the drum 53 using a blade in contact with the drum 53.

The static eliminator removes static electricity remaining on the drum 53. The static eliminator, for example, irradiates the drum 53 with light, thereby releasing static electricity using the nature that electricity easily passes through the photoconductive layer of the drum 53.

The electrostatic charger uniformly charges the surface of the drum 53.

The exposure unit forms an electrostatic latent image on the charged drum 53. The exposure unit irradiates, based on the print data, the surface of the drum 53 with a laser beam using a light emitting element or the like, thereby forming the electrostatic latent image on the surface of the drum 53.

The developing unit 54 is a unit that forms a toner image corresponding to the print data on the drum 53. The developing unit 54 includes a container that receives and contains a developer containing a toner and carrier from the toner cartridge. The containers of the plurality of developing units 54 contain developers of different colors. The container of the developing unit 54c of the process unit 44c contains a cyan toner. The container of the developing unit 54m of the process unit 44m contains a magenta toner. The container of the developing unit 54y of the process unit 44y contains a yellow toner. The container of the developing unit 54k of the process unit 44k contains a black toner. An agitation mechanism is provided inside the container to agitate the toner. The developing unit 54 causes the toner of the developer to adhere to the latent image of the drum 53. Thus, the developing unit 54 forms a toner image on the drum 53.

The plurality of primary transfer rollers 45 is configured to bring the primary transfer belt 47 into contact with the drum 53 of the process unit 44. The plurality of primary transfer rollers 45 are provided so as to correspond to the plurality of process units 44. That is, the plurality of primary transfer rollers 45 are a primary transfer roller 45c that brings the primary transfer belt 47 into contact with the drum 53 of the process unit 44c, a primary transfer roller 45m that brings the primary transfer belt 47 into contact with the drum 53 of the process unit 44m, a primary transfer roller 45y that brings the primary transfer belt 47 into contact with the drum 53 of the process unit 44y, and a primary transfer roller 45k that brings the primary transfer belt 47 into contact with the drum 53 of the process unit 44k. The primary transfer roller 45k is configured to constantly bring the primary transfer belt 47 into contact with the drum 53 of the process unit 44k.

The position switching mechanism 46 drives the primary transfer roller 45c, the primary transfer roller 45m, and the primary transfer roller 45y based on the control of the system controller 87. The position switching mechanism 46 includes a gear, a crank, a motor, and the like for driving the primary transfer roller 45c, the primary transfer roller 45m, and the primary transfer roller 45y. The position switching mechanism 46 drives the primary transfer roller 45c, the primary transfer roller 45m, and the primary transfer roller 45y to displace the primary transfer roller 45c, the primary transfer roller 45m, and the primary transfer roller 45y toward the drum 53 of the process unit 44. Thus, the position switching mechanism 46 brings the primary transfer roller 45c into contact with the drum 53 of the process unit 44c. In addition, the position switching mechanism 46 brings the primary transfer roller 45m into contact with the drum 53 of the process unit 44m. Further, the position switching mechanism 46 brings the primary transfer roller 45y into contact with the drum 53 of the process unit 44y. Accordingly, the position switching mechanism 46 switches a state in which the primary transfer belt 47 is brought into contact with the drums 53 of the process unit 44c, the process unit 44m, and the process unit 44y and a state in which the primary transfer belt 47 is not brought into contact with the drums 53 of the process unit 44c, the process unit 44m, and the process unit 44y.

The primary transfer belt 47 is wound around the secondary transfer counter roller 49, the first winding roller 50, the second winding roller 51, and the third winding roller 52. The secondary transfer counter roller 49, the first winding roller 50, the second winding roller 51, and the third winding roller 52 are respectively rotated by a motor (not illustrated). The primary transfer belt 47 is moved by the rotation of the secondary transfer counter roller 49, the first winding roller 50, the second winding roller 51, and the third winding roller 52. When being in contact with the drum 53, the primary transfer belt 47 receives the toner image formed on the surface of the drum 53 from the drum 53 at a position in contact with the drum 53. The primary transfer belt 47 moves the toner image received from the drum 53 of the process unit 44 to a position (nip portion) where the secondary transfer counter roller 49 and the secondary transfer roller 48 face each other.

The secondary transfer roller 48 is configured to nip the primary transfer belt 47 and the printing medium P together with the secondary transfer counter roller 49. The secondary transfer roller 48 presses the printing medium P against the primary transfer belt 47 to transfer the toner image on the primary transfer belt 47 to the printing medium P.

The fixing unit 43 includes a pair of fixing rollers 55. The pair of fixing rollers 55 are configured to nip the printing medium P therebetween. One (heat roller) of the pair of fixing rollers 55 is heated by a heater (not illustrated). The other (press roller) of the pair of fixing rollers 55 presses the printing medium P against the heat roller. That is, the pair of fixing rollers 55 applies pressure while applying heat to the printing medium P. Thus, the pair of fixing rollers 55 fix the toner image formed on the printing medium P. As a result, an image is formed on the printing medium P.

In the configuration as described above, when the drums 53 of the process unit 44c, the process unit 44m, the process unit 44y, and the process unit 44k are in contact with the primary transfer belt 47, the image forming unit 41 can perform color printing using toners of cyan, magenta, yellow, and black. In this way, the state where the drums 53 of the process unit 44c, the process unit 44m, the process unit 44y, and the process unit 44k are in contact with the primary transfer belt 47 is referred to as a color position.

In the configuration as described above, when the drums 53 of the process unit 44c, the process unit 44m, and the process unit 44y are not in contact with the primary transfer belt 47 and when the drum 53 of the process unit 44k is in contact with the primary transfer belt 47, the image forming unit 41 can perform monochrome printing using a black toner. In this way, the state where the drums 53 of the process unit 44c, the process unit 44m, and the process unit 44y are not in contact with the primary transfer belt 47 and where the drum 53 of the process unit 44k is in contact with the primary transfer belt 47 is referred to as a monochrome position.

The control system of the image forming apparatus 1 will be described below.

As illustrated in FIG. 3, the image forming apparatus 1 includes, as a configuration of the control system and various interfaces, a display unit 81, a speaker 82, a camera 83, a card reader 84, an operation interface 85, a communication interface 86, and a system controller 87.

The display unit 81 includes a display on which a screen is displayed according to a video signal input from the system controller 87 or a display control unit (not illustrated) such as a graphic controller. For example, on the display of the display unit 81, a screen for various settings of the image forming apparatus 1 is displayed.

The speaker 82 outputs a voice according to a voice signal input from the system controller 87. For example, the speaker 82 outputs an alert to a user, who operates the image forming apparatus 1, as a voice.

The camera 83 acquires a facial picture of a person who operates the image forming apparatus 1. The camera 83 captures a range in which the face of the user who operates the image forming apparatus 1 is supposed to appear within a predetermined range in the vicinity of the image forming apparatus 1, and acquires a facial picture.

The card reader 84 is an interface for communicating with an IC card possessed by the user of the image forming apparatus 1. The card reader 84 transmits and receives data to and from the IC card by contact communication or non-contact communication.

The IC card includes an IC chip and a circuit for communication. The IC chip includes a CPU, a ROM, a RAM, a non-volatile memory, and the like. The non-volatile memory of the IC chip includes identification information indicating the used possessing the IC card. The circuit for communication is configured as, for example, an antenna or contact terminals (contact patterns). The circuit for communication is electrically or magnetically connected to the card reader 84.

The card reader 84 acquires identification information indicating the user possessing the IC card by communicating with the IC card.

The operation interface 85 is connected to an operation member (not illustrated). The operation interface 85 supplies an operation signal corresponding to an operation of the operation member to the system controller 87. The operation member is, for example, a touch sensor, a ten key, a power button, a paper feed key, various function keys, a keyboard, or the like. The touch sensor is, for example, a resistive touch sensor or a capacitive touch sensor. The touch sensor acquires information indicating a designated position within a certain area. The touch sensor can be configured as a touch panel integrated with the display unit 81 to input a signal indicating a touched position on a screen displayed on the display unit 81 to the system controller 87.

The communication interface 86 is an interface for communicating with other devices. The communication interface 86 is used for communication with, for example, a host device (external apparatus) that transmits print data to the image forming apparatus 1. The communication interface 86 is configured as, for example, a LAN connector. Further, the communication interface 86 may perform wireless communication with other devices according to standards such as Bluetooth (registered trademark) or Wi-fi (registered trademark).

The system controller 87 controls the image forming apparatus 1. The system controller 87 includes, for example, a processor 91 and a memory 92.

The processor 91 is an arithmetic element (for example, a CPU) that executes arithmetic processes. The processor 91 performs various processes based on data such as a program stored in the memory 92. The processor 91 functions as a control unit capable of executing various operations by executing the program stored in the memory 92.

The memory 92 is a storage medium that stores a program and data used by the program. The memory 92 also functions as a working memory. That is, the memory 92 temporarily stores data being processed by the processor 91 and a program or the like being executed by the processor 91.

In addition, the system controller 87 is connected to, via buses, the ADF 13, the scanner unit 14, the conveyance unit 33, the image forming unit 41, the display unit 81, the speaker 82, the camera 83, the card reader 84, the operation interface 85, and the communication interface 86, for example.

Various processes performed by the processor 91 will be described below.

The processor 91 executes login processing using identification information acquired from the IC card by the card reader 84. Thus, the processor 91 compares the identification information acquired from the IC card with the information about the user stored in advance in the memory 92, and recognizes which user logs in.

The processor 91 executes a program stored in the memory 92, thereby performing a process of generating a print job for forming an image on the printing medium P. The processor 91 acquires print data from an external apparatus via the communication interface 86, for example, and generates a print job based on the acquired print data. Further, the processor 91 generates a print job based on the image acquired by the scanner unit 14.

The print job includes image data indicating an image to be formed on the printing medium P. The image data may be data for forming an image on one printing medium P, or data for forming an image on a plurality of printing mediums P.

Further, the print job includes information (mode information) indicating whether a mode is a color mode or a monochrome mode. The processor 91 determines, based on the print data acquired from the external apparatus, whether a mode is a color mode or a monochrome mode. Further, the processor 91 may determine, based on setting that can be changed by the operation interface 85, whether a mode is a color mode or a monochrome mode.

In addition, the print job includes information (user identification information) indicating the user. For example, the processor 91 adds identification information on the external apparatus, from which the print data is acquired, to the print job as information indicating the user. For example, the processor 91 authenticates with the card reader 84, and adds identification information indicating the logged-in user to the print job as information indicating the user.

Further, the print data may include designation of the number of printing (the number of copies) for the same contents.

The print job may include information (time stamp) indicating the generated time and identification information (identification number).

In addition, the processor 91 executes the program stored in the memory 92 to form an image using the print job. That is, the processor 91 forms the image data of the print job on the printing medium P. Specifically, the processor 91 operates the process unit 44 of the image forming unit 41 based on the image data and inputs a conveyance control signal instructing the conveyance of the printing medium P to the conveyance unit 33, thereby forming an image on the surface of the printing medium P while conveying the printing medium P.

Further, the processor 91 controls the position switching mechanism 46 of the image transfer unit 42 to perform switching to a color position and a monochrome position. The processor 91 controls the position switching mechanism 46 of the image transfer unit 42 to perform switching to the color position. Further, the processor 91 controls the position switching mechanism 46 of the image transfer unit 42 to perform switching to the monochrome position.

The processor 91 determines, depending on the state of the position switching mechanism 46, whether the image transfer unit 42 is currently in the monochrome position or in the color position. For example, the position switching mechanism 46 may be provided with a sensor for determining a monochrome position or a color position. Further, the processor 91 may store a control history of the position switching mechanism 46 in the memory 92, thereby determining whether the current image transfer unit 42 is currently in the monochrome position or in the color position.

Further, when performing color printing, the processor 91 determines whether the image transfer unit 42 is in the color position; when the image transfer unit 42 is not in the color position, the processor 91 switches the image transfer unit 42 to the color position using the position switching mechanism 46. When performing monochrome printing, the processor 91 determines whether the image transfer unit 42 is in the monochrome position; when the image transfer unit 42 is not in the monochrome position, the processor 91 switches the image transfer unit 42 to the monochrome position using the position switching mechanism 46. In this way, when the mode designated by the print job to be executed is different from the position of the image transfer unit 42, the processor 91 performs an initialization process of switching the position of the image transfer unit 42 to the mode (position) designated by the print job.

Further, the processor 91 changes a home position, which is a position of the image transfer unit 42 when waiting for printing, according to predetermined conditions. The home position is either a color position or a monochrome position. The processor 91 stores a history of the print job as history information in a region 93 of the memory 92, and sets a home position based on the history information. The processor 91 controls the position switching mechanism 46 of the image transfer unit 42 at an arbitrary timing, thereby switching the position of the image transfer unit 42 to the position set as the home position. For example, the processor 91 switches the position of the image transfer unit 42 to the position set as the home position when the image forming apparatus 1 is operated or when the next printing is awaited after the printing is completed.

Figure 5:
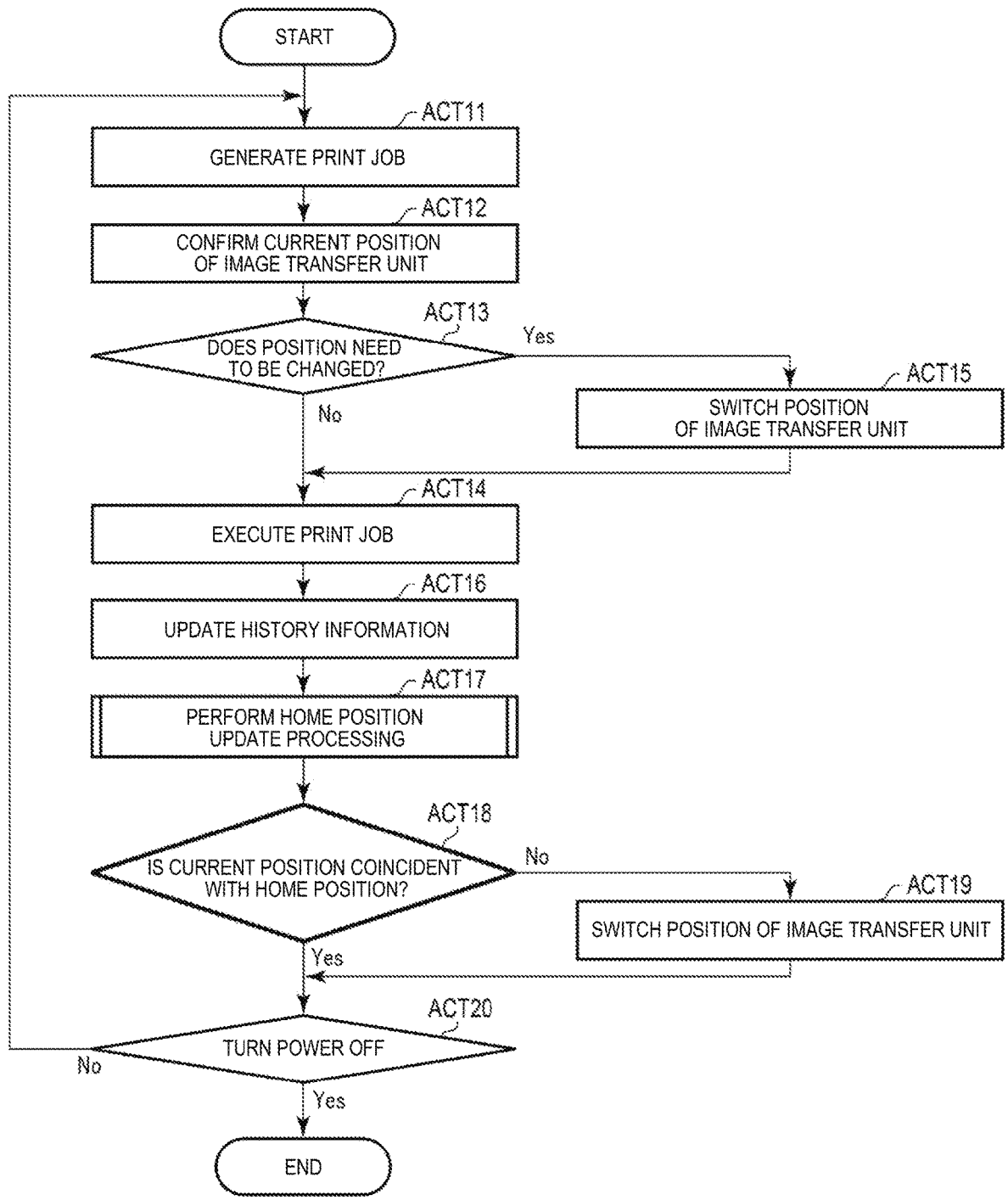
FIG. 5 is a diagram illustrating an operation example of the image forming apparatus.
Figure 7:
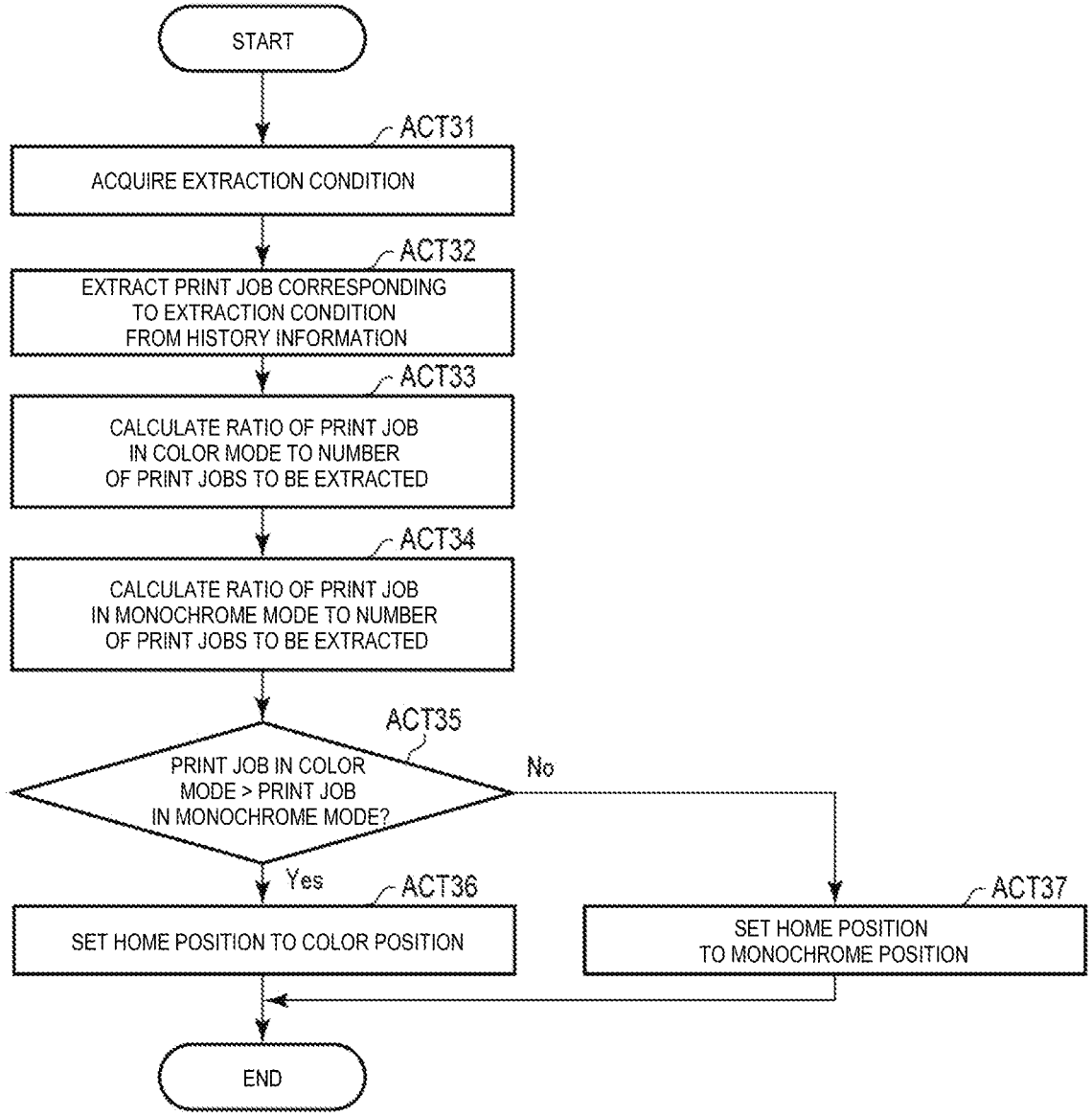
FIG. 7 is a diagram illustrating an example of a home position change to be processed by the image forming apparatus.

FIG. 5 is a flowchart illustrating a process when the processor 91 forms an image using the print job.

When the power supply is turned on, power is supplied to the respective components of the image forming apparatus 1 from a power-supply circuit (not illustrated), the fixing roller 55 of the image forming unit 41 is heated by the heater, and thus the image forming apparatus 1 enters into a state (ready state) in which printing can be performed. In the ready state, the processor 91 generates a print job (ACT11) when acquiring an image using the scanner unit 14 or receiving the print data received through the communication interface 86.

When generating the print job, the processor 91 confirms the position designated by the print job and the current position of the image transfer unit 42 (ACT12). Further, the processor 91 determines whether the position needs to be changed (ACT13). For example, the processor 91 determines that the position needs to be changed when the position designated by the print job does not coincide with the current position of the image transfer unit 42.

When determining that the position does not need to be changed, the processor 91 executes the print job (ACT14). When determining that the position needs to be changed (ACT13, YES), the processor 91 switches the position of the image transfer unit 42 to the position designated by the print job (ACT15), and executes the print job in ACT14.

Upon execution of the print job, the processor 91 updates the history information stored in the region 93 of the memory 92 (ACT16). For example, the processor 91 adds a time stamp to the print job, and stores it in the memory 92 as history information.

FIG. 6 illustrates an example of the history information stored in the memory 92. For each identification number, the history information has information such as date and time (time stamp), user identification information, mode information, the number of printed sheets, and the number of printed copies. When generating a new print job or when executing the generated print job, the processor 91 accumulates the generated print job in the region 93 of the memory 92. When accumulating the print job in the region 93 of the memory 92, the processor 91 may delete the image data of the print job.

Next, the processor 91 reads the history information stored in the region 93, compares a print history in the color mode with a print history in the monochrome mode, and performs a home position update process of updating the home position (ACT17). The processor 91 maintains the previous home position or sets a new home position by the home position update process.

The processor 91 determines whether the current position of the image transfer unit 42 coincides with the position set as the home position (ACT18). When the processor 91 determines that the current position of the image transfer unit 42 coincides with the position set as the home position (ACT18, YES), the process proceeds to ACT20.

When determining that the current position of the image transfer unit 42 does not coincide with the position set as the home position (ACT18, NO), the processor 91 switches the position of the image transfer unit 42 to the position set as the home position (ACT19) by controlling the position switching mechanism 46, and the process proceeds to ACT20.

The processor 91 determines whether the power of the image forming apparatus 1 is turned off (ACT20). The processor 91 stops the supply of power from the power-supply circuit when determining that the power of the image forming apparatus 1 is turned off (ACT20, YES), and ends the process of FIG. 5. Further, when determining that the power of the image forming apparatus 1 is not turned off (ACT20, NO), the processor 91 proceeds to ACT11 and repeatedly executes the processes of ACT11 to ACT19.

As described above, the processor 91 switches the position of the image transfer unit 42 to the position set as the home position after the print job is completed, and waits for the next print job. In addition, the processor 91 may switch the position of the image transfer unit 42 to the position set as the home position even when the image forming apparatus 1 is operated.

The home position update process will be described below.

The processor 91 acquires a preset extraction condition (ACT31). The processor 91 extracts the print job corresponding to the extraction condition from the history information stored in the region 93 (ACT32).

The processor 91 calculates a ratio of the print job in color mode to the number of extracted print jobs (ACT33). Further, the processor 91 calculates a ratio of the print job in monochrome mode to the number of extracted print job (ACT34).

The processor 91 determines which of the color mode print history and the monochrome mode print history is larger (ACT35). In this case, the processor 91 determines which of the ratio (color printing ratio) of the print job in the color mode and the ratio (monochrome printing ratio) of the print job in the monochrome mode is larger. That is, the processor 91 determines which of the color printing ratio and the monochrome printing ratio is larger, the color printing ratio being obtained by setting the number of extracted print job as a denominator and the number of print jobs whose mode information is a color mode among the extracted print job as a numerator, and the monochrome printing ratio being obtained by setting the number of extracted print jobs as a denominator and the number of print jobs whose mode information is a monochrome mode among the extracted print job as a numerator.

When determining that the print history in the color mode is larger than the print history in the monochrome mode (ACT35, YES), the processor 91 sets the home position to the color position (ACT36), and ends the home position update process. Further, when determining that the print history in the color mode is not larger than the print history in the monochrome mode (ACT35, NO), the processor 91 sets the home position to the monochrome position (ACT37), and ends the home position update process. When the print history in the color mode and the print history in the monochrome mode are the same, the processor 91 may maintain the home position that is set so far.

The extraction condition will be described below.

The extraction condition is set based on the information acquired through the operation input or the communication interface 86, and is information that is stored in the memory by the processor 91. The extraction condition is configured by combining user identification information and a period, for example.

For example, the extraction condition includes information that designates a certain period. Specifically, the extraction condition includes information that designates a period such as the number of the latest days, the number of the latest weeks, or the number of the latest months. Further, the extraction condition may include information designating the day of the week. In addition, the extraction condition may include information that designates an arbitrary period in the past.

As described above, when a certain period is designated as the extraction condition, the processor 91 extracts a print job being a period at which the time stamp corresponds to the extraction condition. Thus, the processor 91 can narrow down the print job used for the home position update process under temporal conditions.

For example, the extraction condition may include information for designating a specific user. Specifically, the extraction condition includes information for specifying a user, such as the latest predetermined number of users, fixed specific users, and the like.

In this way, when the information for specifying the user is designated as the extraction condition, the processor 91 extracts the print job, in which the user identification information corresponds to the extraction condition, from the history information. Thus, the processor 91 can narrow down the print job used for the home position update process, by the user.

For example, the extraction condition may be a combination of information for designating a period and information for designating a specific user. In this case, the processor 91 extracts, from the history information, the print job being the period at which the user identification information corresponds to the extraction condition and the time stamp corresponds to the extraction condition. Thus, the processor 91 can narrow down the print job used for the home position update process, by the user and the period.

As described above, the image forming apparatus 1 includes the image transfer unit 42 that can be switched between the color position where printing is performed in the color mode and the monochrome position where printing is performed in the monochrome mode, and the processor 91. The processor 91 generates the print job, and transfers the toner image on the printing medium P by the image transfer unit 42 using the generated print job. The processor 91 controls the image transfer unit 42 at the waiting time, and switch the position of the image transfer unit 42 to the position previously set as the home position. Further, the processor 91 saves the history of the print job as history information. The processor 91 compares, based on the history information, the print history in the color mode with the print history in the monochrome mode. The processor 91 changes the setting of the home position based on the comparison result. Thus, the image forming apparatus 1 can wait for printing at a position where usage frequency is high. As a result, the frequency of initialization process can be reduced.

In addition, the processor 91 compares, based on the history information, the number of print jobs in the color mode with the number of print jobs in the monochrome mode. The processor 91 changes the setting of the home position based on the comparison result. Thus, the processor 91 can determine whether to change the home position by the number of print jobs instead of the number of printed sheets. As a result, the frequency of the initialization process can be reduced.

Further, the processor 91 does not compare the number of print job in the color mode with the number of print jobs in the monochrome mode based on the history information, but compares the number of printed sheets of the print job included in the history information with each other in the color mode and the monochrome mode, and the setting of the home position may be changed based on the comparison result.

Further, the processor 91 extracts the print job corresponding to the preset extraction condition from the history information. The processor 91 calculates the ratio (color printing ratio) of the print job in the color mode to the number of extracted print jobs and the ratio (monochrome printing ratio) of the print job in the monochrome mode to the number of extracted print jobs. The processor 91 sets the home position to the color position when the color printing ratio is larger than the monochrome printing ratio. Further, the processor 91 sets the home position to the monochrome position when the color printing ratio is smaller than the monochrome printing ratio. In addition, the processor 91 maintains the home position set in advance when the color printing ratio and the monochrome printing ratio are the same. In this way, when a part of the print job is extracted from the history information based on the extraction condition, the processor 91 can set the home position based on the print job corresponding to an arbitrary condition.

In addition, when designating a period as the extraction condition, the processor 91 can set the home position based on the print job executed in the arbitrary period.

When designating a user as the extraction condition, the processor 91 can set the home position based on the print job concerning the specific user.

When designating both the period and the user as the extraction condition, the processor 91 can set the home position based on the print job executed in the arbitrary period and the print job concerning the specific user.

Further, the information for designating the specific user under the extraction condition may be information (user narrowing condition) for narrowing the user based on the usage amount of the image forming apparatus 1 for each user.

For example, the processor 91 calculates the usage amount of the image forming apparatus 1 for each user based on the history information. For example, the processor 91 rearranges the user based on the calculated usage amount. The processor 91 designates the user based on the rearranged result. Further, the processor 91 compares, based on the designated user's print job, the color printing ratio with the monochrome printing ratio, and sets the home position based on the comparison result.

For example, the processor 91 rearranges the user in descending order of usage by user. The processor 91 designates a predetermined number of users from high order in the rearrangement result. That is, the processor 91 designates the user in descending order of usage. Thus, it is possible to set the home position according to the user with a high usage amount. The number of users to be designated may be configured to be changeable as appropriate in response to user's operation.

Specifically, the usage amount is information indicating the number of log-in times, the number of print jobs, the number of printed copies, or the number of printed sheets. That is, the processor 91 can designate a predetermined number of users in descending order of the number of log-in times. Further, for example, the processor 91 can designate a predetermined number of users in descending order of the number of print jobs. For example, the processor 91 can designate a predetermined number of users in descending order of the number of printed copies. For example, the processor 91 can set a predetermined number of users in descending order of the number of printed sheets.

In this case, the extraction condition may further include information for designation of the period, and the usage amount may be narrowed down based on the information for designating the period. That is, the processor 91 may calculate the usage amount of the image forming apparatus 1 for each user in the period designated under the extraction condition, and designate the user in descending order of the calculated usage amount.

Further, the processor 91 may be configured to extract the print job of a user whose usage amount of the image forming apparatus 1 calculated for each user exceeds a preset threshold value. According to such a configuration, the processor 91 can set the home position based on the print job of the user whose number of log-in times, the number of print jobs, the number of printed copies, or the number of printed sheets exceeds the threshold value.

The processor 91 may be configured to switch the home position based on the state of the image forming apparatus 1 instead of setting the home position based on the history information. For example, the processor 91 may change whether the home position is set to the monochrome position or the color position based on the remaining amount of toner. For example, when the toner for color printing is insufficient, the processor 91 may be configured to change the home position to the monochrome position regardless of the history information.

In the embodiment described above, the image forming apparatus 1 uses cyan, magenta, yellow, and black toners when the color printing is performed, but another configuration may be used. The image forming apparatus 1 may further include a developing unit that forms a toner image with another toner (for example, a decoloring toner) together with cyan, magenta, and yellow toners.

In the embodiment described above, the color position is a state in which the drums 53 of the process unit 44c, the process unit 44m, the process unit 44y, and the process unit 44k are in contact with the primary transfer belt 47, and the monochrome position is a state in which the drums 53 of the process unit 44c, the process unit 44m, and the process unit 44y are not in contact with the primary transfer belt 47 and the drum 53 of the process unit 44k is in contact with the primary transfer belt 47, but another configuration may be used. Any color position and monochrome position may be used as long as the positional relation between the drum 53 of the process unit 44 and the primary transfer belt 47 is different from each other.

It is to be noted that the functions described in the embodiment can be configured using hardware, and can be realized by reading a program, in which each function is described using software, with a computer. Further, each function may be configured by selecting software or hardware as appropriate.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image forming apparatus comprising:
   an image transfer system configured to switch between a first position and a second position; and
   a processor configured to, when executing a print job by switching to a home position being a position of the image transfer system when waiting for printing,
   switch the position of the image transfer system to a position corresponding to the print job, set the home position based on a print history, and set the home position based on a result of comparison between the number of printed sheets in a first mode and the number of printed sheets in a second mode.

2. The apparatus according to claim 1, wherein the processor is configured to set the home position to either the first mode or the second mode, which has a larger print history.

3. The apparatus according to claim 1, wherein the processor is configured to set the home position based in part on a remaining amount of toner to be used for the first mode.

4. The apparatus according to claim 1, wherein
the processor is configured to set the home position based on a result of comparison between the number of print jobs in the first mode and the number of print jobs in the second mode.

5. An image forming apparatus comprising:
an image transfer system configured to switch between a first position and a second position; and
a processor configured to, when executing a print job by switching to a home position being a position of the image transfer system when waiting for printing,
switch the position of the image transfer system to a position corresponding to the print job,
set the home position based on a print history, and
extract a print job corresponding to an extraction condition set in advance from a history of the print job, and to set the home position based on a result of comparison between the print history in a first mode and the print history in a second mode among the extracted print job.

6. The apparatus according to claim 5, wherein
the extraction condition is information indicating a time period, and
the processor is configured to extract a print job corresponding to the time period indicated by the extraction condition, from the history of the print job.

7. The apparatus according to claim 5, wherein
the extraction condition is information indicating a user, and
the processor is configured to extract a print job corresponding to the user indicated by the extraction condition, from the history of the print job.

8. The apparatus according to claim 7, wherein
the information indicating the user includes information on one or more users who log in to the image forming apparatus.

9. The apparatus according to claim 7, wherein
the information indicating the user is information for narrowing the user down based on a usage amount of each user of the image forming apparatus.

10. The apparatus according to claim 9, wherein the usage amount is information indicating at least one of the number of log-in times, the number of print jobs, the number of printed sheets or the number of printed copies.

11. The apparatus according to claim 9, wherein
the extraction condition further includes information indicating a time period, and
the processor is configured to narrow the user down based on the usage amount of the image forming apparatus in a time period indicated by the extraction condition.

12. The apparatus according to claim 9, wherein
the processor is configured to narrow the user down in descending order of the usage amount.

13. The apparatus according to claim 7, wherein the first mode is a monochrome mode and the second mode is a color mode.

14. The apparatus according to claim 5, wherein
the extraction condition is information indicating a time period and a user, and
the processor is configured to extract a print job corresponding to the time period indicated by the extraction condition and the user indicated by the extraction condition, from the history of the print job.

15. The apparatus according to claim 5, wherein the processor is configured to set the home position to the first mode or the second mode, which has a larger print history.

16. The apparatus according to claim 5, wherein the processor is configured to set the home position based in part on a remaining amount of toner to be used for the first mode.

17. The apparatus according to claim 5, the processor is configured to set the home position based on a result of comparison between the number of print jobs in the first mode and the number of print jobs in the second mode.

18. A control method of an image forming apparatus,
the image forming apparatus including: an image transfer system that is switchable between a first position and a second position; and a processor, the method comprising:
when executing a print job by switching a position of the image transfer system to a home position being a position of the image transfer system when waiting for printing,
switching, via the processor, the position of the image transfer system to a position corresponding to the print job; and
setting the home position based on a print history,
wherein the home position is set based on a result of comparison between the number of printed sheets in a first mode and the number of printed sheets in a second mode.

19. The method according to claim 18, wherein
the home position is set based on a result of comparison between the number of print jobs in a first mode and the number of print jobs in a second mode.

* * * * *